Sept. 16, 1958     D. W. BARGEN     2,852,724
MULTIPLE SYNCHRO HEADING SELECTOR SYSTEM
Filed Oct. 25, 1956
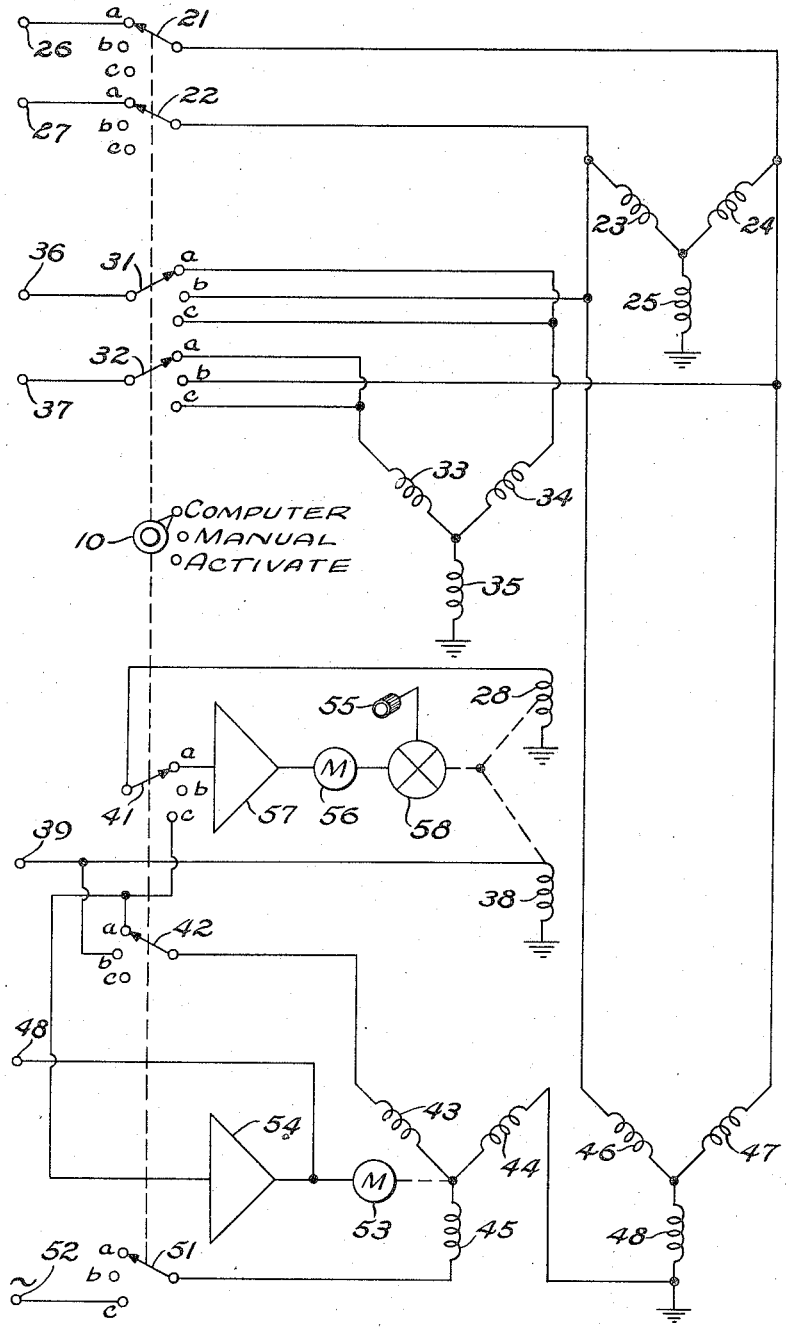
INVENTOR.
DAVID W. BARGEN
BY Moody and Hereka
ATTORNEYS

United States Patent Office 2,852,724
Patented Sept. 16, 1958

2,852,724

MULTIPLE SYNCHRO HEADING SELECTOR SYSTEM

David W. Bargen, Northfield, Minn., assignor to Collins Radio Company, Cedar Rapids, Iowa, a corporation of Iowa Application October 25, 1956, Serial No. 618,308

6 Claims. (Cl. 318—19)

This invention relates to automatic pilot systems and more particularly to the selection of a heading in an automatic pilot system or other aircraft control systems.

It has recently become desirable to be able to program the operation of an automatic pilot system so that headings other than the heading being flown may be selected for future use. Known automatic pilot selection systems are not able to provide this preselected heading feature, where the automatic pilot is flying the aircraft on one heading while the next desired heading is set into the automatic pilot for subsequent utilization. This invention provides a means whereby a heading may be preselected for the automatic pilot and then incorporated into the automatic flight control system as the heading to be flown at any future desired time.

It is an object of this invention to provide a heading selection system whereby the pilot, in conjunction with an automatic pilot system, may select a heading for future flying and then by the operation of a switch, insert this preselected heading as the flight heading of the aircraft.

It is another object of this invention to provide a heading preselection system which may be incorporated into present automatic pilot systems, especially into present heading or course indicator elements.

It is a still further object of this invention to provide a heading preselection system for use with automatic pilots which is economical to construct and essentially foolproof in its operation.

It is another object of this invention to provide a heading preselection system which will display the correct heading information at all times with a second heading being preselected for future flight control.

These and other objects of this invention will become more apparent when read in conjunction with the drawing, in which the single figure is a schematic diagram of one embodiment of this invention.

Referring now to the drawing, there are a plurality of multi-position switch arms 21, 22, 31, 32, 41, 42, and 51 which are mechanically connected together and positioned by selector knob 10 so that they are all at corresponding positions simultaneously. Each of these switch arms individually makes contact with three associated contacts *a*, *b*, and *c*, as shown in the drawing. As referred to herein, *a* is the contact for each switch arm which is referred to as the "computer" function; that is, when all the switch arms are located as depicted in the drawing, the main selector is indicating a computer function. The *b* contact of all these switch arms is a "manual" function contact and the *c* contact for these contact arms is an "activate" function contact. Associated with these switch arms and contacts are two servo systems which employ synchros, referred to as control transformers herein. The first control transformer consists of the stator windings 23, 24, and 25, and the rotor winding 28. The second control transformer consists of the stator windings 33, 34, and 35, and the rotor winding 38. This invention also includes a differential synchro generator which includes the rotor windings 43, 44, and 45, and the stator windings 46, 47, and 48. There is a control knob 55 associated with a gear mechanism 58 which selects the desired heading and places it on a heading indicator system of any of the well-known types. The amplifiers 54 and 57 are basically servo amplifiers of a type well known in the art; motors 53 and 56 are commercially available motors.

This invention operates in the following manner: with the switches in the computer position, that is, as depicted in the drawing, heading information is applied from external sources to contacts 26 and 27. This information is applied to the stator of the first control transformer through the contact arms 21 and 22. This heading information then operates upon the rotor 28 of the first control transformer to position, via motor 56 and gear mechanism 58, control transformer rotors 28 and 38, which are coupled directly together. Simultaneously, compass information from a magnetic compass or a gyro compass aboard the aircraft is applied to the contacts 36 and 37. This compass information is applied through contact arms 31 and 32 to the stator windings of the second control transformer and then to the rotor winding 38. The information from the rotor winding 38 generates a heading error which is applied to contact 39. With the switch arms contacting the computer function contacts, the differential synchro generator is electrically similar to a control transformer, and the rotor and the amplifier 54 comprise essentially a servo loop which is positioned according to the heading information from contact arms 21 and 22. Thus with the switch arms as depicted in the drawing, a heading error signal is generated and applied to the contact 39. It is noted that in all possible connections of the contact arms with the various contacts, this invention produces signals similar to any heading indicator during the flight of an aircraft in automatic control.

Now if it is desired to insert a preselected heading, the switch arms are rotated to the manual position or to the small contact *b* associated with each switch arm. With the switch rotated to this position, the heading information applied to the contacts 26 and 27 is disconnected from this invention. The compass information is now applied to the stator of control transformer. The compass signal is also applied to the stator of the differential synchro generator with the switch arms in the manual position. However, with the switch arms in the manual position, the servo loop, including the rotor 28 and amplifier 57, is rendered inoperable. The rotor of the differential synchro generator remains in the last desired heading and therefore the heading error signal is generated by the operation of the differential synchro generator. This signal is applied through contact arm 42 to contact 39. The compass signal is also disconnected from the second control transformer in the manual position so that the rotor 38 can contribute nothing to the heading error signal on contact 39. Because of this fact, the rotors 28 and 38 may be turned manually by knob 55 and associated gear mechanisms 58. The rotation of the rotor 28 immediately generates an error signal between the stator and rotor of the first control transformer; however, this has no effect upon the heading error signal or the rest of the system due to the disconnection of this portion of the system by contact arm 41 and open contact *b* associated therewith.

Now a new heading has been selected manually for future control of the heading error signal. It is noted that as the aircraft is now flying, with the switch in manual, it is still being controlled by the heading error signal generated from the old heading by the differential synchro generator rotor. If it is now desired to fly according to the heading which has been placed into the system manually, the switch is rotated to the activate position. In this position the heading from the external sources continues to be disconnected from this invention. The compass signals from contacts 36 and 37 through contact arms 31 and 32 are now applied to the stator of the second control transformer and removed from the stator of the first control transformer. The compass signal is also removed from the stator of the differential synchro generator. The application of the compass signal to the second control transformer generates a new heading error signal which is immediately applied to the contact 39. Additionally, switch arm 51 now applies an alternating current voltage from contact 52 to the rotor of the differential synchro generator. The rotor of the differential synchro generator is now being used as a special form of synchro transmitter. A signal is fed from the rotor 28 of the first control transformer through switch arm 41 and amplifier 54, motor 53, to the rotor of the differential synchro generator. This is an error signal between the selected heading and the old heading which, it is recalled, the rotor of the differential synchro generator still indicates. This error signal corresponds to the difference between the rotor positions of the first control transformer and the differential synchro generator. This signal as applied to the amplifier 54 and the motor 53 will soon drive the rotor of the differential synchro generator to the position of the new desired heading as evidenced by the position of rotor 28. It is also the position of the rotor 38 of the second control transformer as they were positioned together under the control of knob 55. The switch 10 has a well-known control device associated therewith which will return the switch to the manual position as soon as the signal from the amplifier 54 is reduced to approximately zero. As is shown, contact 49 is connected with a control device of a well-known type so that immediately upon the positioning of the rotor of the differential synchro generator to the new heading, the selector switch knob 10 will return to the manual position. At this point, since the rotor of the differential synchro generator is the controlling element permitting the preselection of another heading, such preselection may again be made by the knob 55 in the manner described above. This new desired heading may then be incorporated into the automatic pilot system, especially including the heading control system by switching switch 10 to the activate position once more.

Although this invention has been described with respect to a particular embodiment thereof, it is not to be so limited, as changes and modifications may be made therein which are within the full intended scope of the invention, as defined by the appended claims.

What is claimed is:

1. Means for comparing angular information signals including a source of selected angular signals, a source of generated angular signals, means for generating a first difference signal between the selected angular signal and the generated angular information signal, means for choosing a preselected angular signal, means for disconnecting said source of selected signals from said difference signal generating means while continuing to generate a difference signal based upon said selected angular signal, and means for generating a new angular difference signal between the preselected angular signal and said generated angular signal.

2. Means for comparing angular information signals including a source of selected angular signals, means for generating variable angular signals, means for generating a difference signal between said two angular information signals, switching means, means controlled by said switching means for disconnecting said selected angular information signal source from said difference signal generating means and simultaneously continuing the generation of said difference signal using the selected angular signal, means for selecting a new angular information signal, and means controlled by said switching means whereby said new selected angular information signal is compared with said generated angular information signal to produce a new difference signal.

3. Means for comparing angular information signals including a source of selected angular signals, means for generating variable angular signals, means for generating a difference signal between said two angular information signals, switching means, means controlled by said switching means for disconnecting said selected angular information signal source from said difference signal generating means and simultaneously continuing the generation of said difference signal using the selected angular signal, means for selecting a new angular information signal, means controlled by said switching means whereby said new selected angular information signal is compared with said generated angular information signal to produce a new difference signal, and means including automatic control devices for controlling the operation of said switching means whereby another angular information signal may be subsequently selected and compared.

4. A heading preselecting system including a first and a second control transformer, a differential synchro generator, a switching means including a control knob for selecting a desired switch position and a plurality of switching arms with each switching arm having a plurality of contacts associated therewith, said switching means in a first position connecting a heading information signal supplied from an external source to the stator of said first control transformer by certain of said switch arms and associated contacts, a compass signal from an external source connected by said switching means in the first switch position to the stator of said second control transformer, the rotors of said first and said second control transformers mechanically linked together, said heading signal also connected to the stator of the differential synchro generator in the first switch position, means for generating a heading error signal between the desired heading and the actual compass heading with said switching means in the first position, including an amplifier and a motor for comparing the signals on the stators of the first and second control transformers, means for generating a similar heading error signal when said switching means are in a second position including said switching means, the compass signal applied to the stator of the differential synchro generator and the heading signal which is now supplied from the rotor of the differential synchro generator, means for manually imposing a new selected heading upon said control transformers, means whereby when said switching means are moved to a third switch position a new heading error signal is generated using the heading selected by said heading selector means when said switches were in their second position including the compass signals applied to the stator of said second control transformer, the rotor of said second control transformer, a second amplifying means and a second motor means connected to the rotor of said differential synchro generator, and the differential synchro generator being thereby positioned to correspond to the new selected heading.

5. A heading preselecting system including a first and a second control transformer, a differential synchro generator, a switching means including a control knob for selecting a desired switch position and a plurality of switching arms with each switching arm having a plurality of contacts associated therewith, said switching means in a first position connecting a heading information signal supplied from an external source to the stator of said first control transformer by certain of said switch arms and associated contacts, a compass signal from an external source connected by said switching means in the first switch position to the stator of said second control transformer, the rotors of said first and said second control transformers mechanically linked together, said heading signal also connected to the stator of the differential synchro generator in the first position, means for generating a heading error signal between the desired heading and the actual compass heading with said switching means in the first position, including an amplifier and a motor for comparing the signals on the stators of the first and second control transformers, means for generating a similar heading error signal when said switches are in their second position including said switching means, the compass signal applied to the stator of the differential synchro generator and the heading signal which is now supplied from the rotor of the differential synchro generator, means for manually imposing a new selected heading upon said control transformers, means whereby when said switching means are moved to a third switch position a new heading error signal is generated using the heading selected by said heading selector means when said switches were in their second position including the compass signals applied to the stator of said second control transformer, the rotor of said second control transformer, a second amplifying means and a second motor means connected to the rotor of said differential synchro generator, the differential synchro generator being thereby positioned to correspond to the new selected heading, and means for automatically returning said switch means to its second position when the rotor of the synchro generator corresponds to the position of the rotor of the second control transformer so that another new preselected heading may be selected.

6. A heading preselecting system including a first and a second control transformer, a differential synchro generator, a switching means including a control knob for selecting a desired switch position and a plurality of switching arms with each switching arm having a plurality of contacts associated therewith, said switching means in a first position connecting a heading information signal supplied from an external source to the stator of said first control transformer by certain of said switch arms and associated contacts, a compass signal from an external source connected by said switching means in the first switch position to the stator of said second control transformer, the rotors of said first and said second control transformers mechanically linked together, said heading signal also connected to the stator of the differential synchro generator in the first position, means for generating a heading error signal between the desired heading and the actual compass heading with said switching means in the first position, including an amplifier and a motor for comparing the signals on the stators of the first and second control transformers, means for generating a similar heading error signal when said switches are in their second position including said switching means, the compass signal applied to the stator of the differential synchro generator and the heading signal which is now supplied from the rotor of the differential synchro generator, means for manually imposing a new selected heading upon said control transformers, means whereby when said switching means are moved to a third switch position a new heading error signal is generated using the heading selected by said heading selector means when said switches were in their second position including the compass signals applied to the stator of said second control transformer, the rotor of said second control transformer, a second amplifying means and a second motor means connected to the rotor of said differential synchro generator, the differential synchro generator being thereby positioned to correspond to the new selected heading, and means for automatically returning said switch means to its second position when the rotor of the synchro generator corresponds to the position of the rotor of the second control transformer so that another new preselected heading may be selected and inserted into an automatic flight control system by selectively operating the switching means from its second to its third position.

References Cited in the file of this patent

UNITED STATES PATENTS 2,794,594    Ergen et al. _____ Jan. 4, 1957